United States Patent
Shyu et al.

(10) Patent No.: US 7,499,231 B2
(45) Date of Patent: Mar. 3, 2009

(54) AUTO-FOCUS LENS MODULE

(75) Inventors: San-Woei Shyu, Taipei (TW);
Shih-Chao Huang, Taipei (TW);
Hsien-Ru Chu, Taipei (TW)

(73) Assignee: E-Pin International Tech Co., Ltd., Taipei (TW)

( * ) Notice: Subject to any disclaimer, the term of this patent is extended or adjusted under 35 U.S.C. 154(b) by 118 days.

(21) Appl. No.: 11/790,475

(22) Filed: Apr. 25, 2007

(65) Prior Publication Data
US 2008/0266681 A1    Oct. 30, 2008

(51) Int. Cl.
*G02B 7/02* (2006.01)

(52) U.S. Cl. .................. 359/824; 359/819; 359/823; 359/811

(58) Field of Classification Search ............... 359/811, 359/813, 814, 819, 821, 822, 823, 824
See application file for complete search history.

(56) References Cited

U.S. PATENT DOCUMENTS 6,424,472 B1 * 7/2002 Chen .................. 359/819

* cited by examiner

*Primary Examiner*—Timothy J Thompson
(74) *Attorney, Agent, or Firm*—Troxell Law Office, PLLC

(57) ABSTRACT

An auto-focus lens module that uses electromagnetic force as well as spring force as driving force to drive the lens for auto-focusing is formed by a rectangular base, two copper plates, an insulation spacer, four magnets, a lens holder, a lens, a coiled spring, a coil, and a rectangular top cover. The lens holder, the lens and the coil form a lens set that moves synchronously. The coiled spring is between the coil and the lens and is elastically supporting between a circular slot of the lens holder and the top cover while the four magnets are respectively located outside the coil symmetrically and equidistantly, on four corners of the rectangular base so that the structure and volume of the lens module are simplified and minimized. Moreover, the distance between the coil and the magnets is shortened so that the electromagnetic force therebetween is increased. Furthermore, the diameter of the coiled spring is reduced for improving stability of the spring force.

5 Claims, 7 Drawing Sheets

AUTO-FOCUS LENS MODULE

BACKGROUND OF THE INVENTION

The present invention relates to an auto-focus lens module, especially to a lens module that uses electromagnetic force as well as spring force as driving force to control movement of the lens for auto-focusing.

Either digital cameras or mobile phones with shooting function are disposed with a lens module that includes stepless type or two-step auto focusing type. However, structure of conventional lens module is still quite complicated with quite large volume, against the principle of compact design. Moreover, spring blades are used to balance the electromagnetic force while the spring blades are easy to be deformed by external forces such as vibration, rebounding or after being used for a long time so that the stability and accuracy of the movement of the lens holder have been affected. The inventor of the present invention has applied U.S. patent application Ser. Nos. 11/284,880, 11/385,791 and application Ser. No. 11/484,674, wherein a coil is sleeved between a lens and a coiled spring. That means the coiled spring is outside the coil so that the distance between the coil and the magnets is increased and the electromagnetic force generated therebetween is reduced. Moreover, the coiled spring is sleeved outside the coil so that the diameter of the coiled spring is larger compared with the coil Thus balance and stability of the coiled spring have been affected. Therefore, there is still a space for improvement.

SUMMARY OF THE INVENTION

Therefore it is a primary object of the present invention to provide an auto-focus lens module formed by a rectangular base, two conductive plates, an insulation spacer, four magnets, a lens holder, a lens, a coiled spring, a coil, and a rectangular top cover. The lens holder, the lens, and the coil form a lens set that moves synchronously. The coiled spring is sleeved between the lens and the coil and is elastically supporting between an outer circular slot and the top cover while the four magnets are respectively located outside the coil symmetrically and equidistantly, on four corners of the rectangular base. Thus structure of the lens module according to the present invention is simplified and the volume of the device is minimized. Furthermore, the distance between the coil and the magnets is shortened so that the electromagnetic force therebetween is increased. Moreover, the diameter of the coiled spring is reduced so as to increase stability of the spring force.

DETAILED DESCRIPTION OF THE PREFFERED EMBODIMENT

Figure 1:
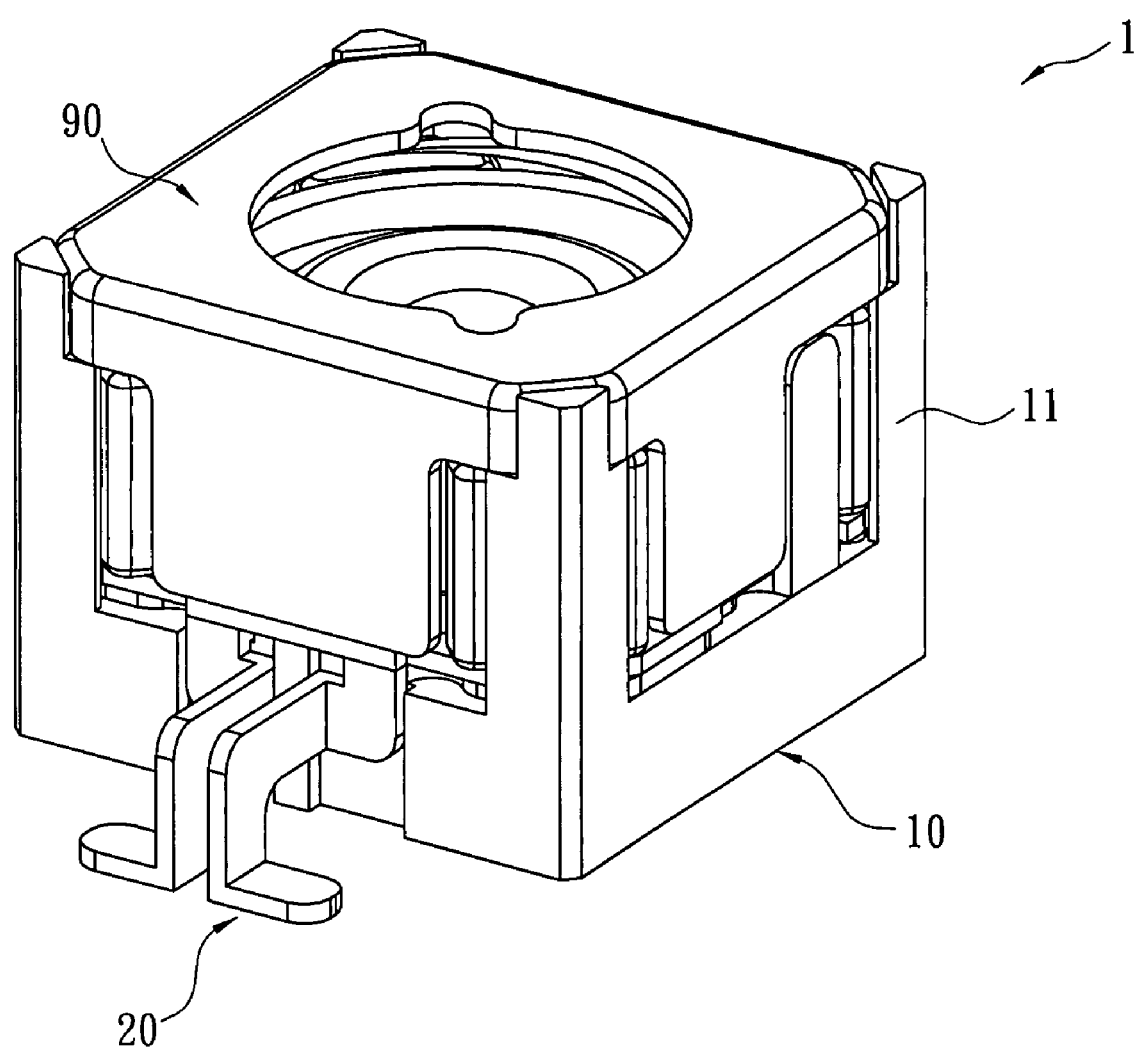
FIG. 1 is a perspective view of an embodiment according to the present invention.
Figure 2:
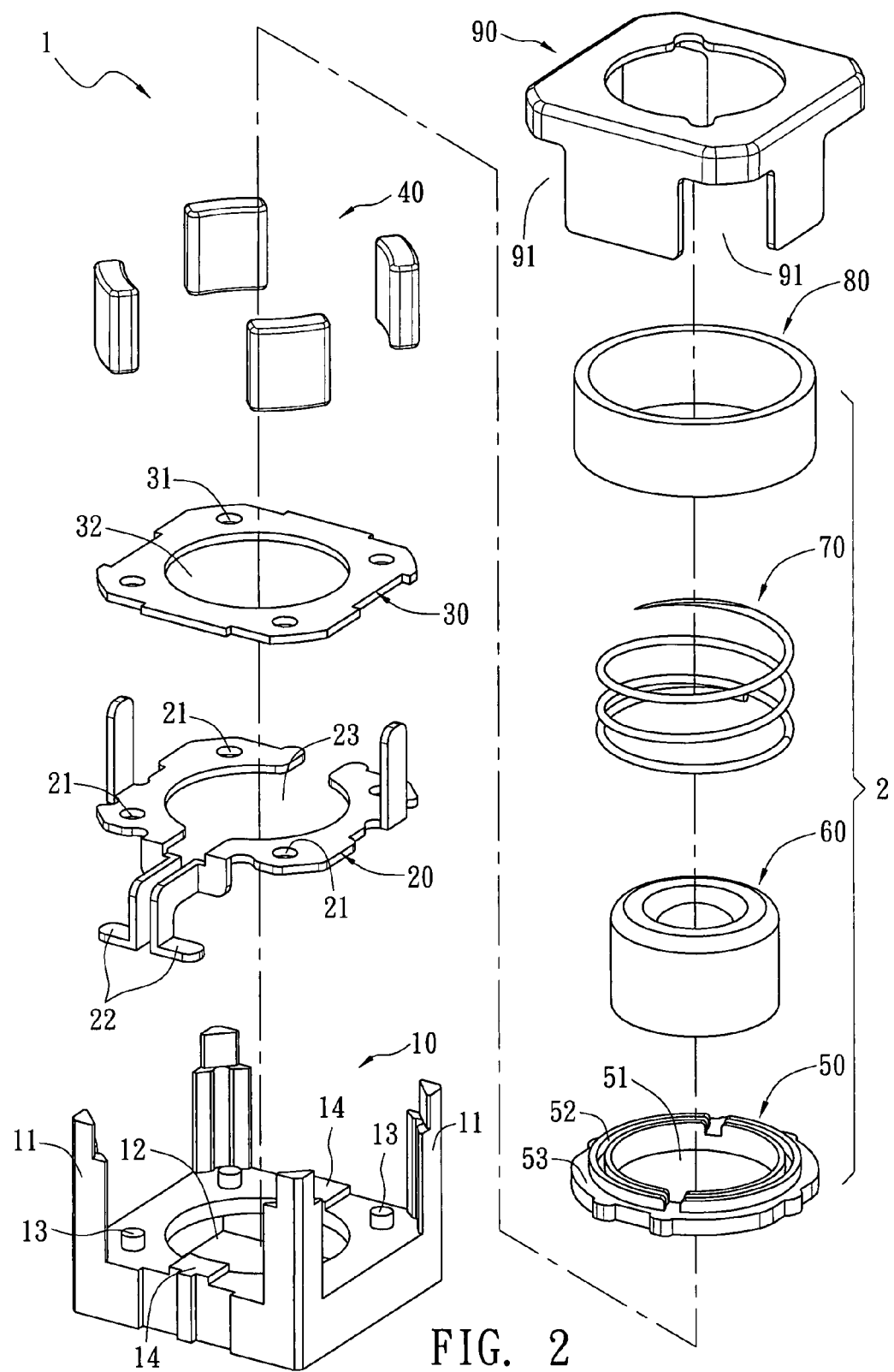
FIG. 2 is an explosive view of the embodiment in FIG. 1 according to the present invention.
Figure 3:
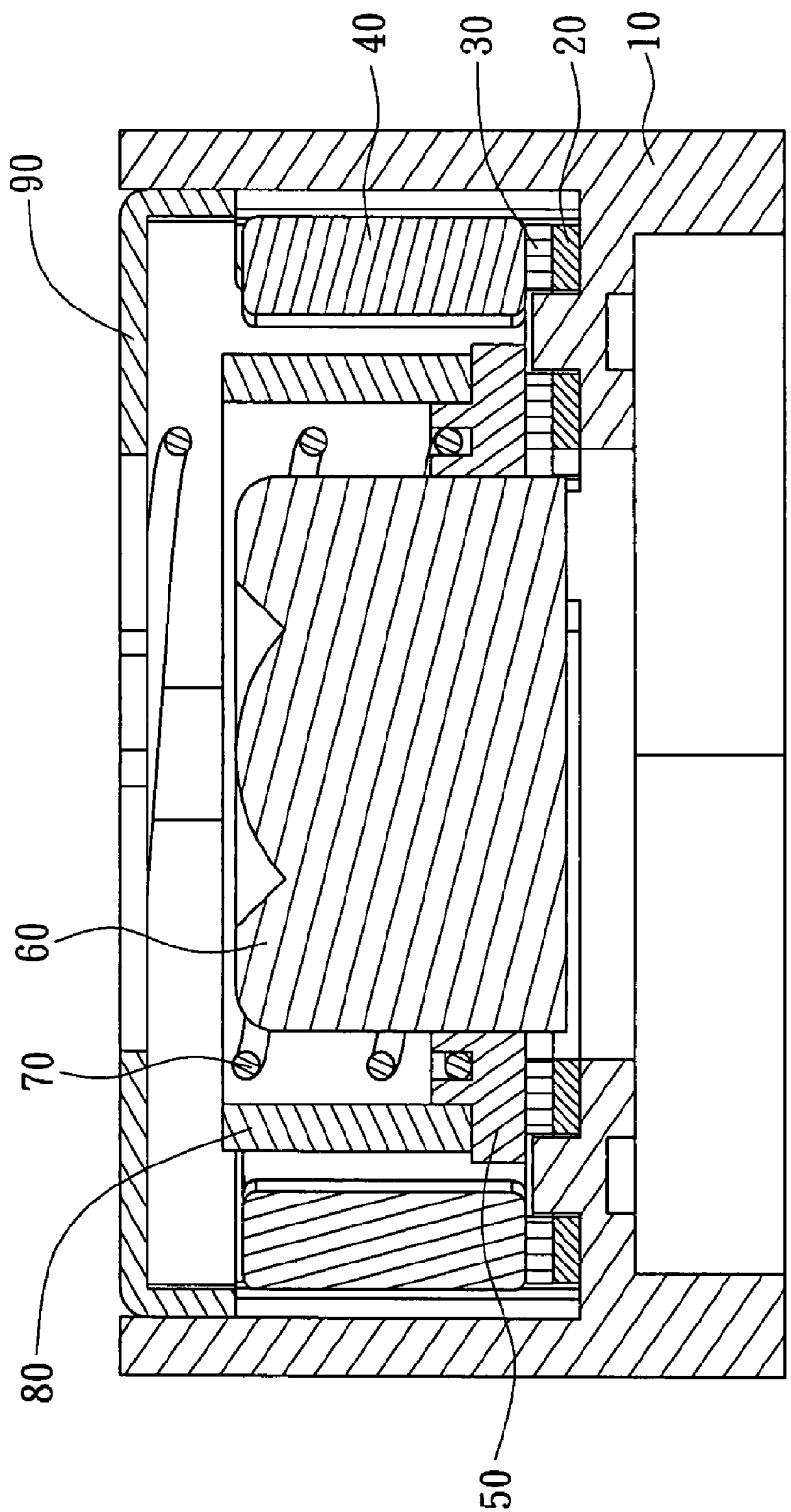
FIG. 3 is a lateral cross-sectional view of the embodiment in FIG. 1 according to the present invention.

Refer from FIG. 1 to FIG. 3, a lens module 1 according to the present invention includes a rectangular base 10, two conductive plates 20 such as copper plates, an insulation spacer 30, four magnets 40, a lens holder 50, a lens 60, a coiled spring 70, a coil 80, and a rectangular top cover 90. As shown in FIG. 2, a lens set 2 formed by the lens holder 50, the lens 60 and the coil 80 moves upwards and downwards (forwards/backwards) between the base 10 and the top cover 90 for focusing.

Figure 4:
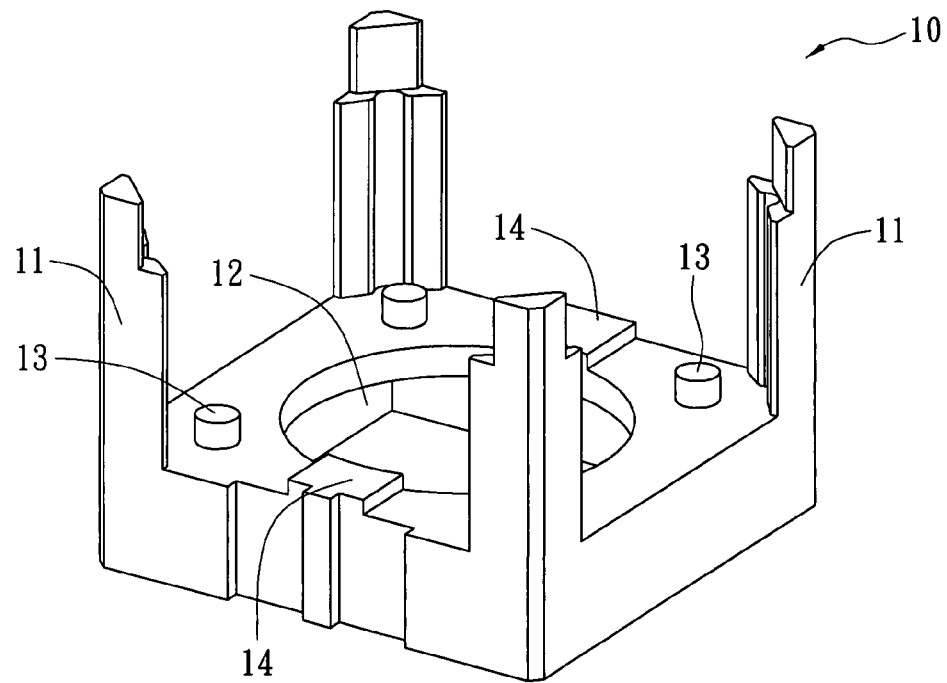
FIG. 4-FIG. 10 are schematic drawings showing assembling of each component according to the present invention.

Refer to FIG. 4, the base 10 is a rectangular frame with four stands 11 on four corners for assembling with the top cover 90. A central hole 12 on center of the base 10 is used to form an opening in optical pathway of the lens 60. A plurality of positioning pins 13 and projections 14 for isolation are arranged on inner surface of the base 10.

Figure 5:
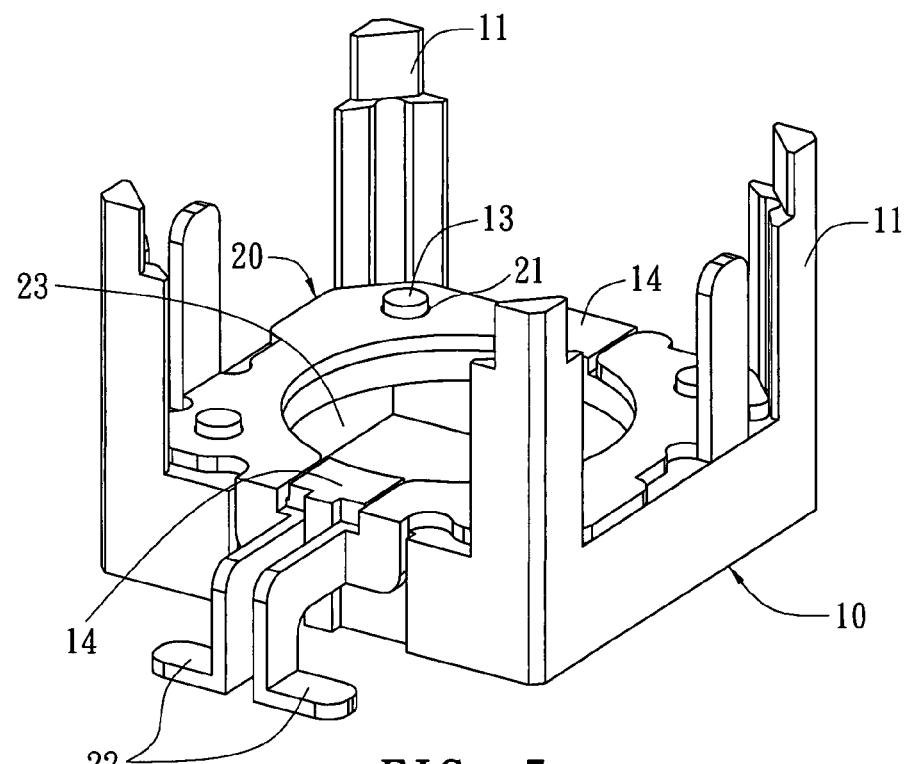

Refer to FIG. 5, by the combination of the positioning hole 21 and the positioning pins 13, the two conductive plates 30 are disposed on the base 10 in insulated status and respectively connect to different electrodes by projecting pieces 22. Moreover, a central hole 23 corresponding to the central hole 12 of the base 10 is formed between the two conductive plates 20.

Figure 6:
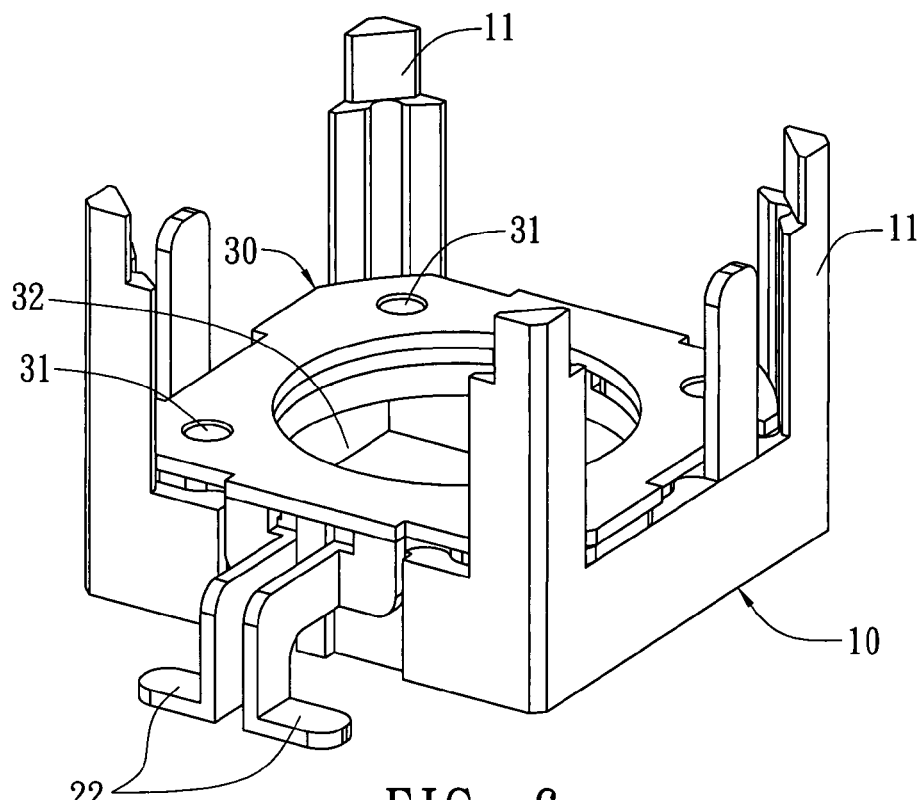

Refer to FIG. 6, the isolation spacer 30 attaches on the two conductive plates 20 by positioning holes 31 and corresponding positioning pins 13 thereof. The isolation spacer 30 having a central hole 32, corresponding to the central holes 12, 23.

Figure 7:
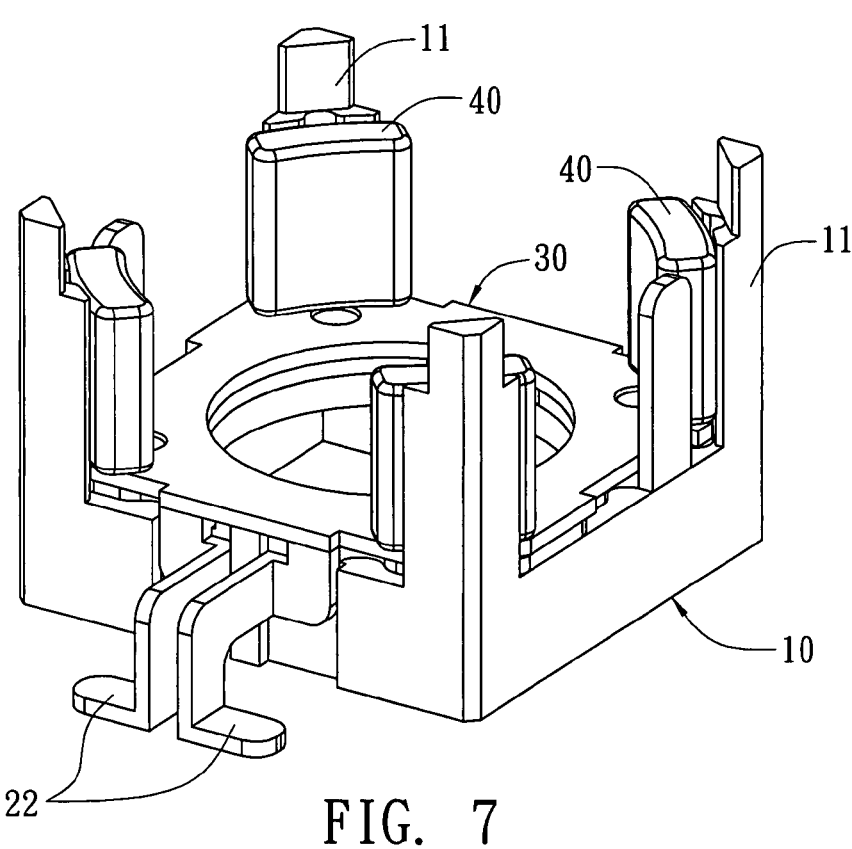

As shown in FIG. 7, the four magnets 40 are symmetrical arched magnets, respectively arranged on inner side of the four stands 11 of the rectangular base 10, being positioned by inner surface of the top cover 90. The four magnets 40 can also be respectively arranged and fixed on inner surface of four corners of the top cover 90 for convenience of assembling.

Figure 8:
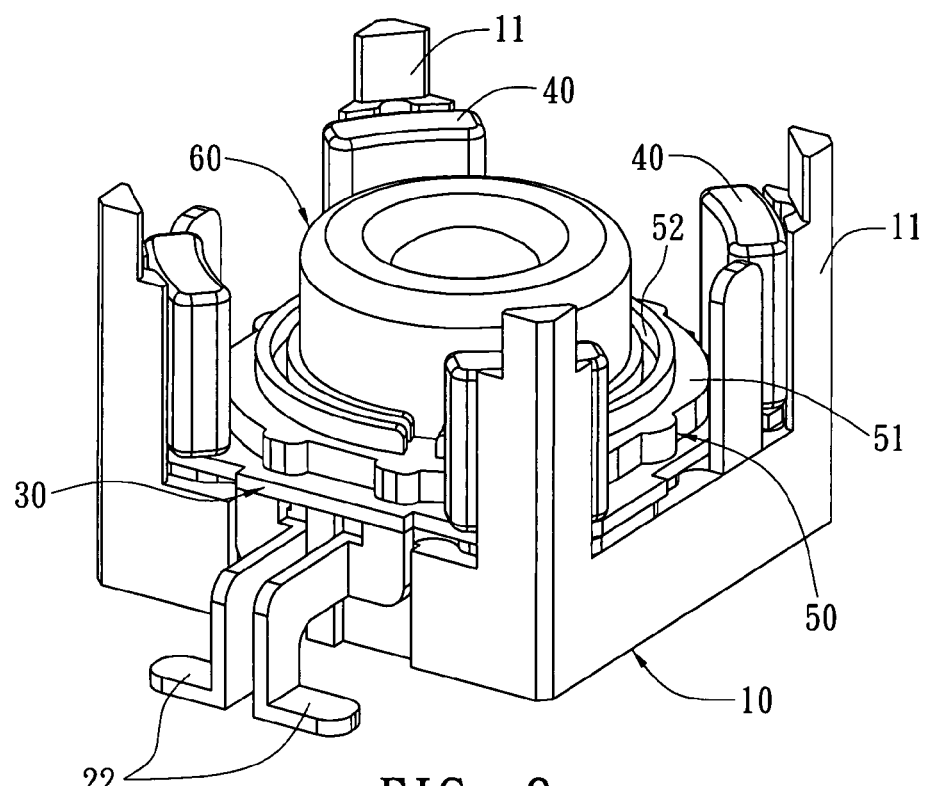
Figure 9:
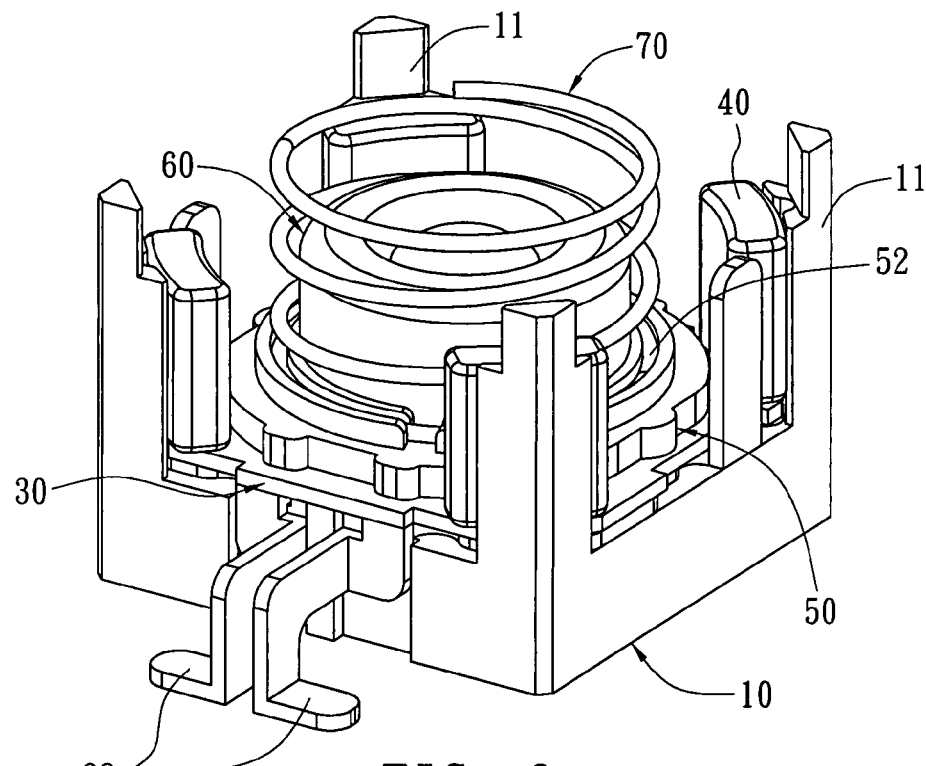
Figure 10:
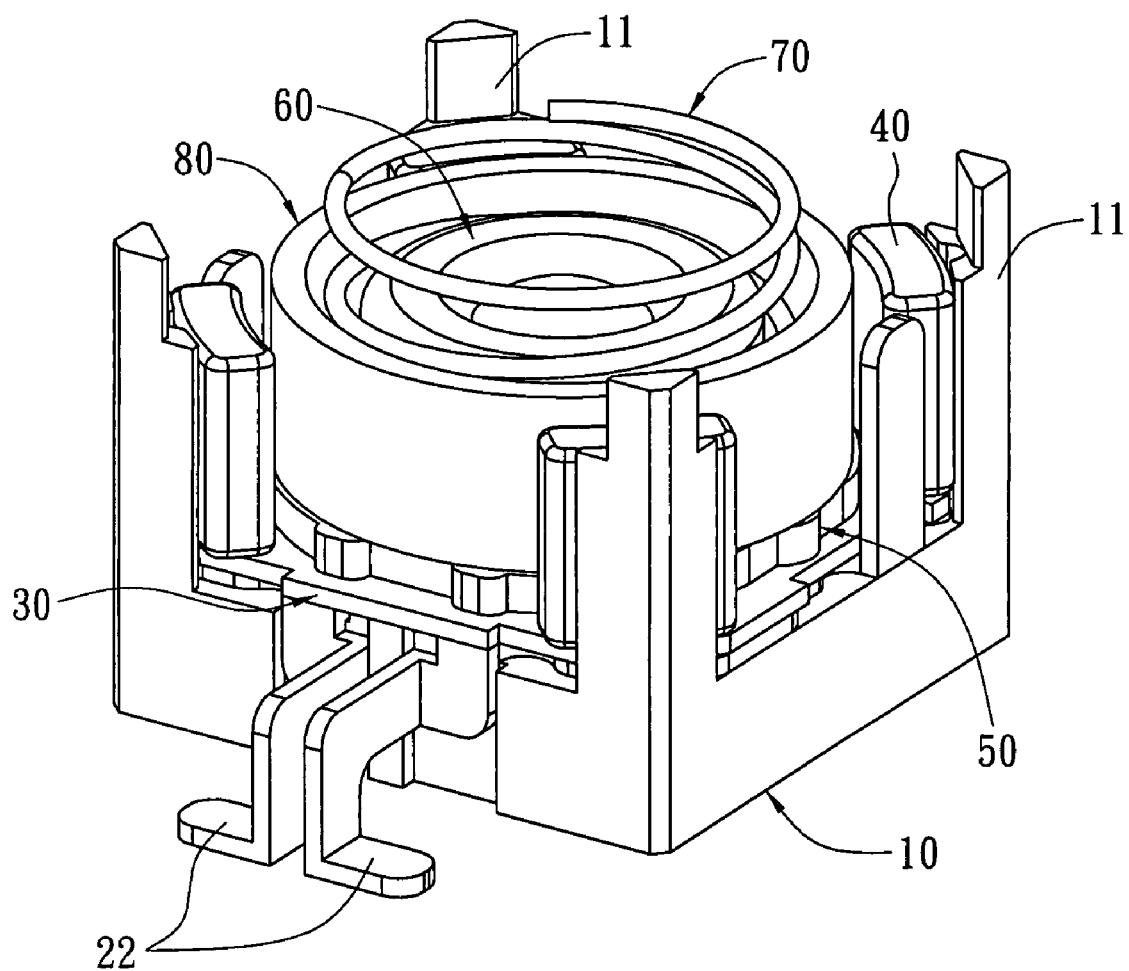

Refer from FIG. 8 to FIG. 10, there is no limitation on order of assembling of the lens holder 50, the lens 60, the coiled spring 70 and the coil 80. The lens holder 50 is a cylinder with a central hole 51, a circular slot 52 and an outer circular flange 53 while the lens 60 is fixed on the central hole 51 of the lens holder 50 by threads or glue. There is no limitation on the way of fixing. The coiled spring 70 is sleeved between the lens 60 and the coil 80 and the two ends thereof are respectively supporting between the circular slot 52 of the lens holder 50 and inner surface of the top cover 90. The coil 80 is surrounding outside the outer circular flange 53 of the lens holder 50, located outside the coiled spring 70. Furthermore, the coil 80 and the lens holder 50 can be connected by adhesion so as to make the lens holder 50 the lens 60 and the coil 80 form a lens module 2 that moves synchronously, as shown in FIG. 2. The lens module 2 is arranged on top of the insulation spacer 30 so that the lens 60 and each central hole 12, 23, 32 are on the same axis.

Refer to FIG. 1, the top cover 90 is a housing designed for assembling with the base 10, having truncated ends 91 on four corners thereof so as to make the top cover 90 mount between the four stands 11 of the base 10 and fasten with the base 10 to form the lens module 1. Moreover, the four magnets 40 are clipped and fixed firmly between inner surface of the top cover 90 and the insulation spacer 30 without displacement.

The coiled spring 70 can be compression springs. When the top cover 90 fastens with the base 10, the coiled spring 70 is in compressed status, pressing the lens holder 50 downwards so as to make the lens holder set 2 stop on "dead point" during the zoom-in/zoom-out process, this is the far focus position. By changing electrodes and current on head and tail of the coil 80, in combination with the N and S poles of the magnets 40, electromagnetic force forwards/backwards (upward/downward) is generated so, as to drive the lens holder set 2 moving forwards/backwards (upwards/downwards) for focusing. In this embodiment, the electromagnetic force between the coil 80 and the magnets 40 is generated forwardly. While the lens holder set 2 is at far focus, there is no current passing through the coil 80 so that no electromagnetic force is generated and the lens holder set 2 stays backwards in "dead point" (far focus position).

While focusing, certain amount of current passes through the coil 80 so as to generate an electromagnetic force that drives the lens holder set 2 to move forwards(upwards) and stop at close focus. When the electromagnetic force acted on the lens holder set 2 equals to the compression force of the coiled spring 70, the lens holder set 2 stops at the adjusted position. Therefore, the lens holder set 2 moves from the far focus to the close focus forwards(upwards) by the electromagnetic force while turns back from the close focus to the far focus downwards by restoring force of the coiled spring 70. By means of circuit design, the lens set 2 has stepless type or two step type (far focus/close focus) auto-focusing.

Compare with conventional lens module, the present invention only uses the coiled spring 70 sleeved on the circular slot 52 of the lens holder 50 while the four magnets 40 are respectively located on inner side of four stands of the rectangular case 10. The structure is simplified and the volume is reduced so that the lens module 1 is effectively minimized. Moreover, due to that the coiled spring 70 is sleeved between inner surface of the coil 80 and the circular slot 52 outside the lens 60, the coil 80 is located outside the coiled spring 70. Thus the distance between the coil 80 and the four magnets 40 is reduced so as to increase electromagnetic force between the coil 80 and the magnets 40. Moreover, diameter of the coiled spring 70 is also reduced so that the stability of the spring force is improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An auto-focusing lens module comprising a base, two conductive plates, an insulation spacer, four magnets, a lens holder, a lens, a coiled spring, a coil, and a top cover, wherein the base that is a rectangular frame with four stands on four corners for fastening with the top cover while a central hole is on center thereof to form an opening in optical pathway of the lens; a plurality of positioning pins are disposed on inner surface thereof;

the conductive plates are secured on the base in insulated status by assembling of positioning holes and the positioning pins of the base and a central hole corresponding to the central hole of the base is formed between the two conductive plates;

the insulation spacer is disposed with positioning holes corresponding to the positioning pins of the base so that the insulation spacer attaches on the two conductive plates; the insulation spacer having a central hole;

the magnets are symmetrical arched magnets, respectively arranged on inner side of the four stands of the base;

the lens holder is a cylinder having a central hole, a circular slot and an outer circular flange arranged outside the circular slot;

the lens is mounted and fixed on the central hole of the lens holder;

the coiled spring is sleeved outside the lens and is disposed on the circular slot of the lens holder for elastically supporting between the circular slot and inner surface of the top cover;

the coil is enclosed outside the coiled spring and is fixed on the outer circular flange of the lens holder while a head wire and a tail wire of the coil are respectively connected to different electrodes of the two conductive pieces;

the top cover is disposed over and fastened with the base;

the lens holder, the lens and the coil are assembled into a lens module that moves synchronously; the lens module is driven by electromagnetic force between the coil and the magnets and restoring force of the coiled spring so as to achieve auto-focusing effects.

2. The auto-focus lens module as claimed in claim 1, wherein the lens is fixed on the central hole of the lens holder by threads or glue.

3. The auto-focus lens module as claimed in claim 1, wherein the coil is fixed on the outer circular flange of the lens holder by glue.

4. The auto-focus lens module as claimed in claim 1, wherein a truncated end is arranged on each of four corners of the top cover and is corresponding to the stand of the base.

5. The auto-focus lens module as claimed in claim 1, wherein movement of the lens module for focusing includes stepless type or far focus/close focus two-step type focusing.

* * * * *